Feb. 25, 1941.   D. M. LIGHT   2,233,348
DRAFT GEAR
Filed June 9, 1939   2 Sheets-Sheet 1
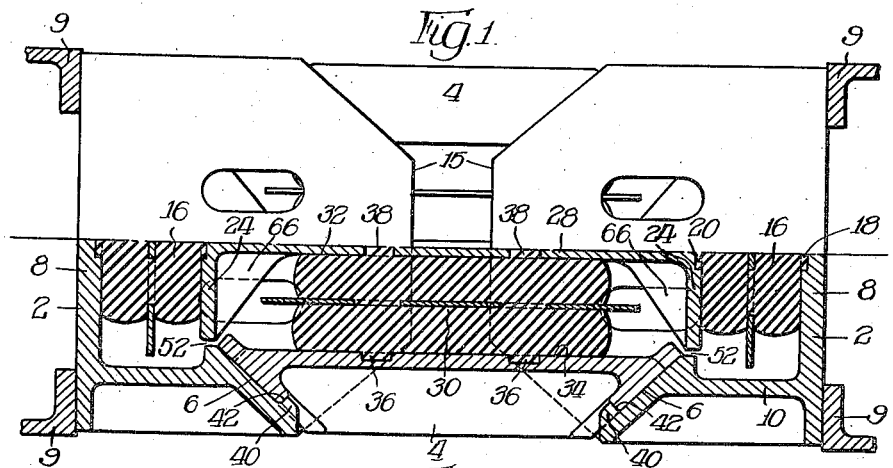
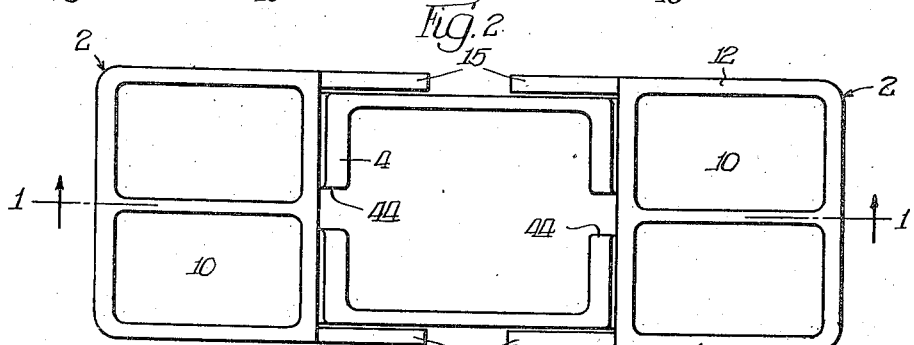
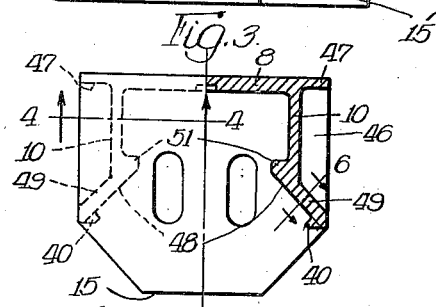
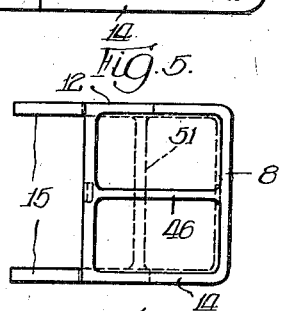
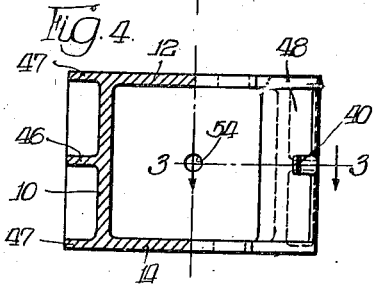
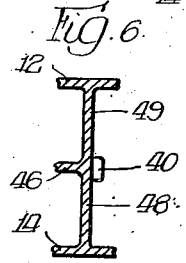
INVENTOR.
David M. Light,
BY
ATTORNEY.

Feb. 25, 1941.  D. M. LIGHT  2,233,348
DRAFT GEAR
Filed June 9, 1939  2 Sheets-Sheet 2
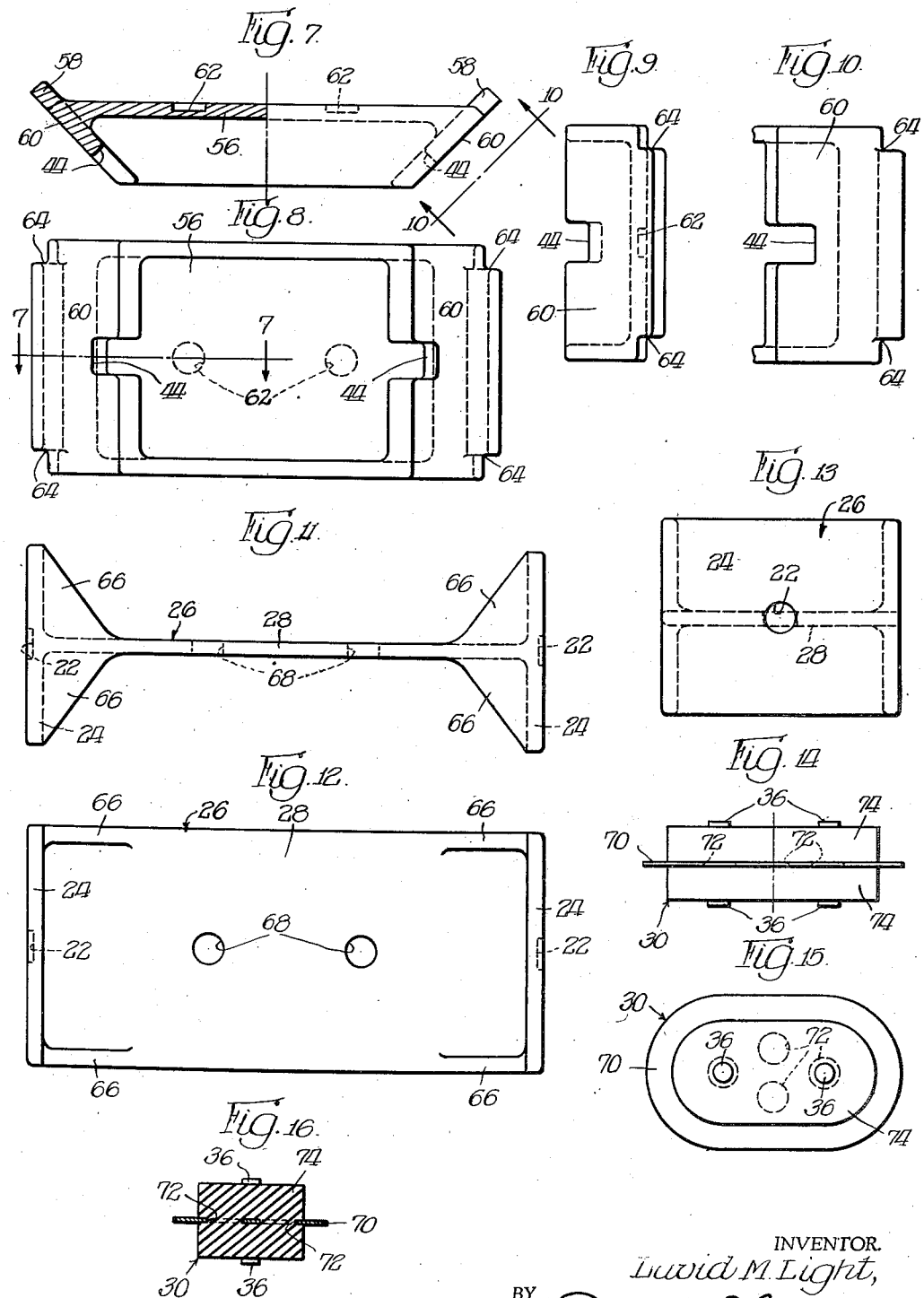
INVENTOR.
David M. Light,
BY
ATTORNEY.

Patented Feb. 25, 1941

2,233,348

UNITED STATES PATENT OFFICE 2,233,348

DRAFT GEAR

David M. Light, Chicago, Ill., assignor to American Steel Foundries, Chicago, Ill., a corporation of New Jersey Application June 9, 1939, Serial No. 278,241

19 Claims. (Cl. 213—39)

My invention relates to shock absorbing mechanism for a railway car and more particularly to such a structure designed to fit and operate within the accepted standard length of draft gear pocket of 24⅝" without the use of followers. In draft gear mechanisms as commonly furnished today, solid steel followers are used at each end of the shock absorbing device and the said followers constitute dead weight simply serving as stop means.

My novel form of shock absorbing device comprises identical end followers and side wedges arranged to have engagement with a plurality of resilient means and with each other to produce the desired amount of friction absorbing capacity.

In arranging my novel structure to eliminate the followers commonly used I have produced a device of substantially lighter weight than that required with the ordinary shock absorbing device which is associated with followers at each end.

An object of my invention is to design a self-contained shock absorbing device incorporating the above-mentioned features and applicable to cars of present standard construction on American railroads.

Another object of my invention is a shock obsorbing device as herein described wherein certain resilient means shall function to produce the desired amount of friction absorption and certain other resilient means shall function to operate as release means for the mechanism.

A definite object of my invention is to so arrange the component parts of my novel gear as to provide stops on the end followers to take over-solid blows, thus preventing excessive compression of the resilient means which might otherwise reduce their efficiency or shorten their period of usefulness.

My novel device also comprehends a friction absorbing device particularly suitable for the use of rubber springs as distinguished from metal spring devices whether plate or coil type.

My invention further contemplates such an arrangement as above described wherein the parts are so constructed and arranged as to prevent a compression of the rubber springs beyond the amount recommended to assure maximum length of life and efficiency.

The above and other objects will be more clearly apparent from the attached description of the associated drawings and the appended claims.

In the drawings Figure 1 is a top plan view, half in section, of a shock absorbing device embodying my invention, the section being taken substantially in the horizontal plane bisecting the device and as indicated by the line 1—1 of Figure 2.

Figure 2 is a side elevation of the structure shown in Figure 1.

Figure 3 is a top plan view, half in section, of my novel form of follower wedge, the section being taken substantially in the plane indicated by the line 3—3 of Figure 4.

Figure 4 is an end view, half in section, of the follower wedge, the section being taken substantially in the plane indicated by the line 4—4 of Figure 3.

Figure 5 is a side elevation of the follower wedge shown in Figures 3 and 4.

Figure 6 is a sectional view therethrough taken substantially in the plane indicated by the line 6—6 of Figure 3.

Figure 7 is a top plan view, half in section, of my novel form of side wedge, the section being taken substantially in the plane indicated by the line 7—7 of Figure 8.

Figure 8 is a side elevation taken from the outer face of the side wedge and Figure 9 is an end elevation thereof.

Figure 10 is an additional end elevation taken at an angle viewed from the plane indicated by the line 10—10 of Figure 7.

Figures 11, 12 and 13 show central stop means associated with my novel device, Figure 11 being a top plan view thereof, Figure 12 a side elevation, and Figure 13 an end view.

Figure 14 is a side elevation of the compression spring used in my novel gear, Figure 15 is a top plan view thereof, and Figure 16 is a sectional view taken substantially in the transverse vertical plane bisecting the spring.

Describing the structure in greater detail, my novel draft gear comprises identical follower wedges 2, 2 and side wedges 4, 4, each of said followers presenting inwardly directed diagonal faces in vertical planes having engagement as at 6, 6 with diagonally arranged outwardly directed plane faces on the side wedges 4, 4. Each follower wedge 2 is bisymmetrical in form and of general box shape with the rear wall 8 affording a seat against the standard center sill draft lugs as at 9, 9, the lateral walls 10, 10, the top wall 12 and the bottom wall 14, said top and bottom walls projecting beyond the friction surfaces at 6 to form stop means 15 for abutment with the opposite follower wedge in case of over-solid blows. Within each of the end follower housings is supported a rubber spring 16 of novel form more particularly described hereafter, said spring being retained in position against the wall 8 by positioning means 18. The opposite end of the spring is likewise afforded positioning means at 20 in the form of a lug received within the recesses 22 in the end wall 24 of the central stop 26, said stop having a central vertical wall 28 extending along the longitudinal vertical axis of the gear and having at its opposite end the similar end wall 24 affording abutment for the end spring 16 at the opposite end of the gear. Between the longitudinal wall 28 of the stop 26 and each side wedge is positioned a resilient means 30 in the form of a rubber spring more particularly described hereinafter, said rubber spring having an extensive flat surface in engagement as at 32 along the wall 28 and the opposite side likewise having extensive engagement as at 34 with the opposing wall of the side wedge 4. Positioning means between the resilient means 30 and the side wedge 4 are afforded in the form of lugs 36 on the resilient means received in cavities of corresponding size and shape within the walls of the side wedges and similar positioning means are afforded between the wall 28 of the central stop and the spring 30 as at 38.

The parts of the device are retained in assembled relationship by lugs 40, 40 centrally formed at the outer edges of the end follower friction surfaces, said lugs having abutment as at 42, 42 with stops formed at the inner edges of the central slots 44, 44 on the side wedges. The gear as a whole is thus a self-contained device and may be handled as a unit for application to cars. In the operation of assembling the parts some compression of the main springs 30 is required in order to engage the lugs 40 within the notches 44.

The follower wedge is shown in detail in Figures 4, 5 and 6. As already indicated, it is a generally box-like structure comprising the lateral walls 10, 10 joining the top and bottom walls 12 and 14 and the rear wall 8; said top and bottom walls projecting forwardly to form stop means 15, 15. The lateral walls 10, 10 are also reinforced by the intermediate horizontal webs 46, 46, and the rear wall 8 is extended laterally at both ends in flanges 47, 47, thus further reinforcing the structure.

The forward ends of the lateral walls are formed with diagonally arranged portions 49, 49, having friction faces 48, 48 in vertical planes for engagement with abutting plane faces on the side wedges as already referred to. The inner extremities of the diagonal portions 49, 49 terminate in the vertical shoulders 51, 51 serving to limit the lateral movement of the central stop 26 as best seen at 52, 52 in the assembly view of Figure 1. Centrally formed in the rear wall 8 is the recess 54 for reception of positioning means 18 on the rubber spring 16.

The form of the side wedges is shown in detail in Figures 7 to 10 inclusive. Each comprises a generally rectangular structure having the longitudinal wall 56 with the diagonally arranged end portions 58, 58 formed with the flat friction surfaces 60, 60 for engagement with the before-mentioned friction surfaces 48, 48 of the respective end wedges. The longitudinal wall 56 has a plurality of recesses 62, 62 acting as receptacles for positioning means 36, 36 formed on the compression springs 30, 30. At the outer edge of the diagonal portion 58 and at the middle thereof is formed the slot 44 for reception of the lug 40 formed on the end follower wedge, thus affording retaining means for the several parts after assembly as already referred to. The inner edges of the diagonal portions 58, 58 are notched as at 64, 64 to afford clearance for the reinforcing ribs 66, 66 of the center stop 26.

The detail of the center stop 26 is shown in Figures 11, 12 and 13. It comprises the central vertical longitudinal wall 28 with end walls 24, 24 affording seats for the springs 16, 16 and having the central recesses 22, 22 forming positioning means therefor in cooperation with the before-mentioned lugs 18, 18. Reinforcing gussets or ribs 66, 66 connect the end walls 24, 24 with the longitudinal wall 28, said gussets being formed at the top and bottom edges of the end walls. A plurality of perforations 68, 68 are formed in the longitudinal wall 28 for the reception of positioning means on the compression spring 30.

The detail of the rubber spring 30 is shown in Figures 14, 15 and 16. It will be seen to comprise a centrally positioned flat steel plate 70 arranged in a vertical plane with a plurality of perforations 72, 72 through which the rubber portion 74 of the structure may flow in the vulcanizing process by which it is formed, thus securing the rubber body to the central flat plate 70. On each side of the rubber body portion 74 are formed a plurality of positioning means 36, 36 serving to retain the spring 30 in its proper relative position with respect to the associated side wedge and the center stop. The release springs 16, 16 are generally similar in structure and formation to the compression springs 30, 30 and differ therefrom only in size and shape.

The operation of the gear is simple. With the parts in normal position as shown in Figure 1 the rubber springs 16, 16 and 30, 30 are under some slight compression as shown by their bulging ends. As the gear is compressed the follower wedges 2, 2 are moved toward each other and through the frictional engagement at 6, 6 with the side wedges force said side wedges toward each other and closer to longitudinal wall 28 of the center stop 26, thus compressing the main springs 30, 30. At the same time the release springs 16, 16 are compressed between the end walls 24, 24 of the center stop and the end walls 8, 8 of the follower wedges so that when the load is removed the release springs 16, 16 operate to move the end followers in the reverse direction, thus permitting the return of all parts to normal position.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction absorbing device, end followers in the form of housings having lateral walls with diagonal friction faces adjacent their open ends, top and bottom walls extended to form stops for abutment with each other, resilient means housed in said followers, a center stop interposed between said resilient means, side wedges having diagonal friction surfaces in engagement with said faces, slots formed adjacent opposite ends of said wedges, compression springs interposed between said center stop and said side wedges, said center stop and said end followers having positioning means for said resilient means and said center stop and said side wedges having positioning means for said compression springs, lugs centrally located on the outer edges of said lateral walls and engaging said slots to retain said device in assembled relationship, and guide means on said lateral walls for said center stop.

2. A friction absorbing device comprising end followers with lateral walls having diagonal friction faces adjacent their open ends, release means housed in each of said followers, a center stop extending between said release means, side wedges having diagonal friction surfaces in engagement with said faces, slots formed adjacent opposite ends of said wedges, compression springs interposed between said center stop and said side wedges respectively, means on said lateral walls limiting the lateral movement of said center stop, interlocking means on said side wedges and said lateral walls to retain said parts in assembled relationship and including lugs centrally located on the outer edges of said lateral walls and engaging said slots, and guide means on said lateral walls for said center stop.

3. A friction absorbing device comprising end followers formed as housings with lateral walls having diagonal friction faces, resilient means housed in said followers, a member extending between said means, side wedges having diagonal friction surfaces in engagement with said faces at opposite sides of said device, slots formed adjacent opposite ends of said wedges, compression springs interposed between said member and said side wedges respectively, lugs centrally formed on the extreme edges of the lateral walls of said followers cooperating with said slots on said side wedges to retain said parts in assembled relationship, abutments formed on the top and bottom walls of said followers for engagement with each other to prevent undue compression of said means and springs, and positioning means for said center stop formed on said lateral walls intermediate the ends thereof.

4. In a friction absorbing device, end followers in the form of housings having lateral walls with diagonal friction faces adjacent their open ends, top and bottom walls extended to form stops for abutment with each other, resilient means housed in said followers, a center stop extending between said resilient means, side wedges having diagonal friction surfaces in engagement with said faces, compression springs interposed between said center stop and said side wedges, said center stop and said end followers having positioning means for said resilient means and said center stop and said side wedges having positioning means for said compression springs, and positioning means for said center stop formed on said lateral walls intermediate the ends thereof.

5. In a friction absorbing device, end followers of box-like form opening at their inner ends, release springs within said followers, a rigid center stop extending between said springs, diagonally arranged friction faces formed at the outer ends of said followers on the lateral walls thereof, side wedges having friction surfaces in cooperation with said first-mentioned friction faces, resilient means interposed between said center stop and said side wedges respectively, interlocking means on the abutting portions of said side wedges and said followers retaining said parts in assembled relationship, and guide means on said lateral walls limiting the lateral movement of said center stop.

6. A friction absorbing device comprising end followers with lateral walls presenting opposing diagonal portions with friction surfaces adjacent the ends thereof, release means housed in each of said followers, a rigid column extending between said release means, side wedges each presenting diagonal end portions with friction faces in engagement with said surfaces, compression springs interposed between said side wedges in abutment with said rigid column, means on said lateral walls intermediate the ends thereof limiting the lateral movement of said column, and interlocking means on said diagonal portions of said wedges and walls to retain said parts in assembled relationship.

7. In a friction absorbing device, end followers in the form of housings having lateral walls with diagonally arranged end portions presenting inwardly directed friction faces adjacent their open ends, release means housed in said followers, a rigid column extending between said release means, side wedges having diagonally arranged end portions presenting friction surfaces in engagement with said faces, pads of resilient material compressed between said side wedges in engagement with said column urging said surfaces and faces into engagement with each other, and lugs on the diagonal portions of said followers engaging shoulders on the diagonal portions of said wedges to retain said parts in assembled relationship.

8. A friction absorbing device, comprising integrally formed end followers having lateral walls presenting diagonal end portions with flat friction surfaces adjacent their open ends, pads of resilient material forming release means housed in each of said followers, a member forming a rigid column between said release means, side wedges each presenting at their opposite ends diagonally arranged portions with friction faces in engagement with said surfaces, pads of resilient material in compression between said side wedges and engaging said column, and interengaging means on the diagonal portions of said wedges and lateral walls to retain said parts in assembled relationship.

9. In a friction absorbing device, integral end followers of box-like form opening at their inner ends and having lateral walls presenting diagonally arranged portions with inwardly directed friction faces, release springs within said followers, a rigid member extending between said springs, side wedges having diagonally arranged end portions presenting friction surfaces in engagement with said faces, resilient means under compression between said side wedges in engagement with said rigid member, and stop means on said followers limiting relative longitudinal movement thereof, certain of said stop means having engagement with said wedges to retain said device in assembly.

10. In a friction absorbing device, integral end followers of box-like form having lateral walls with diagonally arranged portions presenting opposite inwardly directed friction faces adjacent their open ends, side wedges having diagonally arranged end portions with friction surfaces in engagement with the corresponding friction faces of said followers, release springs housed in said followers, a rigid member extending between said release springs, compression springs interposed between said member and said side wedges, and lugs on the diagonal portions of said lateral walls engaging slots on the diagonal portions of said wedges to retain said parts in assembled relationship.

11. In a friction absorbing device, end followers each in the form of an integral housing having lateral walls with diagonally arranged end portions presenting inwardly directed friction faces adjacent their open ends, release springs housed in said followers, a rigid member extending between said springs, side wedges each having diagonally arranged end portions presenting friction surfaces in engagement with said faces and compression springs interposed between said side wedges in engagement with said member, and interlocking means on said diagonal portions of said wedges and followers retaining said parts in assembled relationship.

12. A friction absorbing device comprising end followers each formed as an integral housing with lateral walls having diagonally arranged end portions presenting vertical inwardly directed friction faces, resilient means housed in each follower, a rigid member extending between said resilient means, side wedges having diagonally arranged end portions with friction surfaces in engagement with said faces at opposite sides of said device, and pads of resilient material in compression between said side wedges and in engagement with said member, and slots on the diagonal portions of said wedges engaging lugs on the diagonal portions of said lateral walls to limit the expansion of said device in release.

13. In a friction absorbing device, end followers each in the form of an integral housing having vertical lateral walls with diagonal end portions presenting inwardly directed flat friction faces, top and bottom walls extended beyond said friction faces for abutment with each other to limit the compression of said device, resilient means housed in each follower, a rigid member extending between said means, side wedges each presenting diagonal end portions with friction surfaces in engagement with said faces, and pads of resilient material in compression between said member and said wedges urging said surfaces and faces into engagement with each other, and interlocking means formed on said diagonal portions of said wedges and walls to retain said parts in assembled relationship and limit the movement of said followers with respect to each other as said device is expanded.

14. In a friction absorbing device, opposite housings having open ends directed toward each other, each of said housings having lateral walls with diagonally arranged end portions presenting inwardly directed friction surfaces, resilient means within each housing, a rigid member extending between said means, side wedges each presenting diagonal end portions with outwardly directed friction faces in engagement with said surfaces at opposite sides of said device, pads of resilient material in compression between said wedges and said member respectively, and interengaging means on the diagonally arranged portions of said wedges and walls for retaining said parts in assembled relationship.

15. In a friction absorbing device, opposite end followers each formed as an integral member of box-like shape with top and bottom walls and lateral walls, said lateral walls presenting adjacent their ends diagonally arranged portions with inwardly directed flat friction faces, pads of resilient material seated in each of said followers, a rigid column extending between said pads, side wedges each presenting diagonal end portions with flat friction surfaces in engagement with said faces, and pads of resilient material in compression between said side wedges and in engagement with said column, and lugs on the diagonally arranged portions of said walls engaging slots on the diagonally arranged portions of said wedges to interlock said wedges and followers.

16. In a friction absorbing device, opposite end followers each formed as an integral member of box-like shape with top and bottom walls and lateral walls, said lateral walls presenting adjacent their end diagonally arranged portions with inwardly directed flat friction faces, pads of resilient material seated in each of said followers, a rigid column extending between said pads, side wedges each presenting diagonal end portions with flat friction surfaces in engagement with said faces, and pads of resilient material in compression between said side wedges and in engagement with said column, lugs on the diagonal end portions of said walls engaging slots on the diagonally arranged portions of said wedges to interlock said wedges and followers, and guide means formed on the lateral walls of said followers intermediate the ends thereof to limit the lateral movement of said column.

17. In a friction absorbing device, end followers in the form of box-shaped housings each having lateral walls presenting diagonally arranged end portions with inwardly directed flat friction faces and top and bottom walls extending beyond said diagonal portions to form abutting stop means, pads of resilient material in each of said housings with a rigid column extending therebetween, side wedges each presenting diagonal end portions with outwardly directed flat friction surfaces in engagement with said faces, pads of resilient material compressed between said wedges in engagement with said column, and interlocking means on said followers and said wedges for retaining said device in assembly.

18. In a friction absorbing device, end portions each in the form of a rectangular housing having lateral walls with diagonally arranged end portions presenting inwardly directed flat friction faces, top and bottom walls extending beyond said diagonal portions for abutment with each other to limit the compression of said device, resilient pads of resilient material in each follower with a rigid column extending therebetween, side wedges having diagonally arranged end portions presenting outwardly directed flat friction surfaces in engagement with said faces and compression pads of resilient material between said side wedges and in engagement with said column, and interlocking means on said diagonal portions of said wedges and walls to limit the expansion stroke of said device.

19. In a friction absorbing device, end followers each in the form of a rectangular housing having lateral walls with diagonally arranged end portions presenting inwardly directed flat friction faces, top and bottom walls extending beyond said diagonal portions for abutment with each other to limit the compression of said device, release pads of resilient material in each follower with a rigid column extending therebetween, side wedges having diagonally arranged end portions presenting outwardly directed flat friction surfaces in engagement with said faces and compression pads of resilient material between said side wedges and in engagement with said column, interlocking means on said diagonal portions of said wedges and walls to limit the expansion stroke of said device, and lugs formed on said lateral walls intermediate the ends thereof to limit the lateral movement of said column when said device is in expanded position.

DAVID M. LIGHT.